May 4, 1954  O. SCHERMERHORN  2,677,486
FISHERMAN'S BOX
Filed May 3, 1950  2 Sheets-Sheet 1
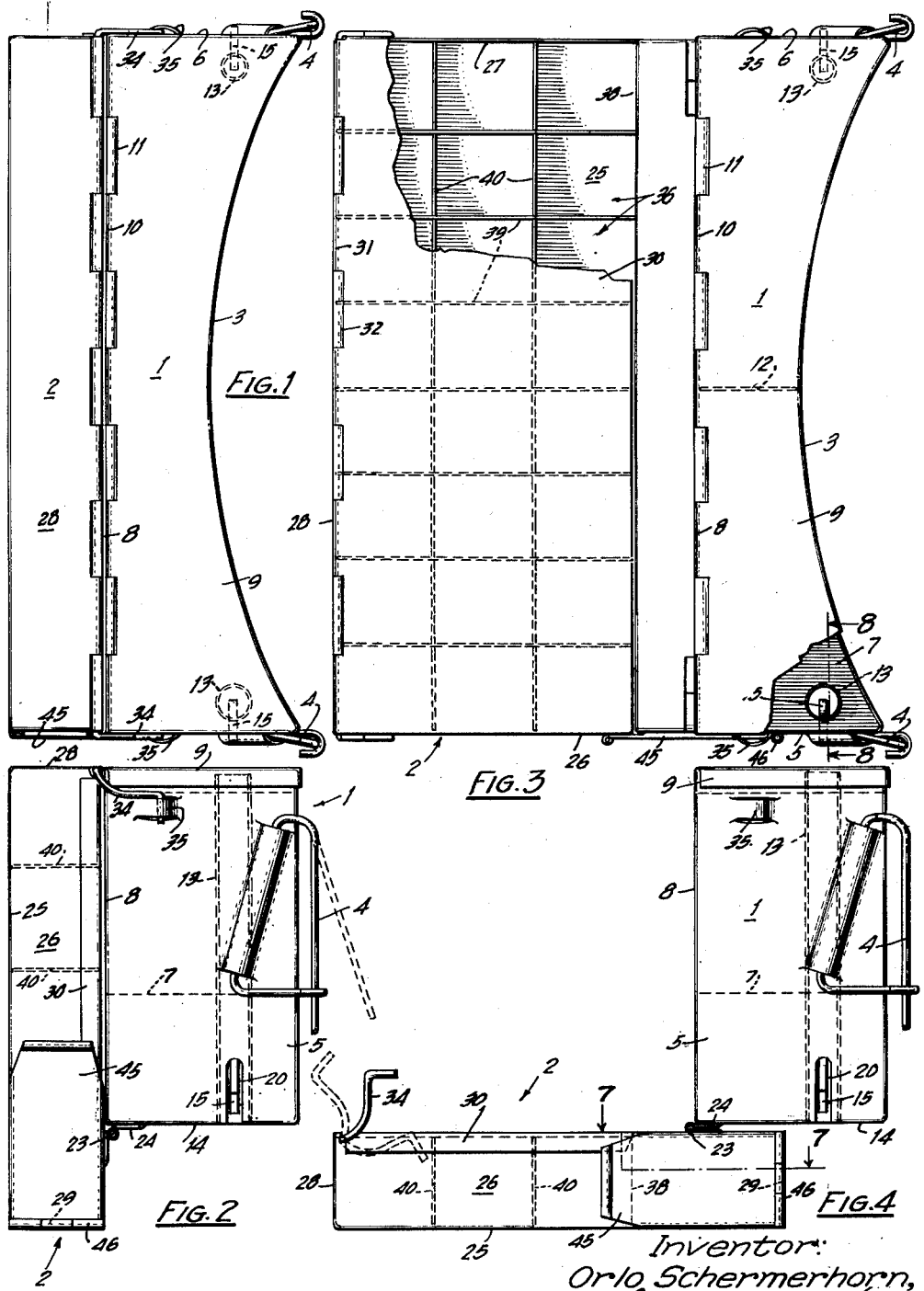
Inventor:
Orlo Schermerhorn,
by
His Attorneys.

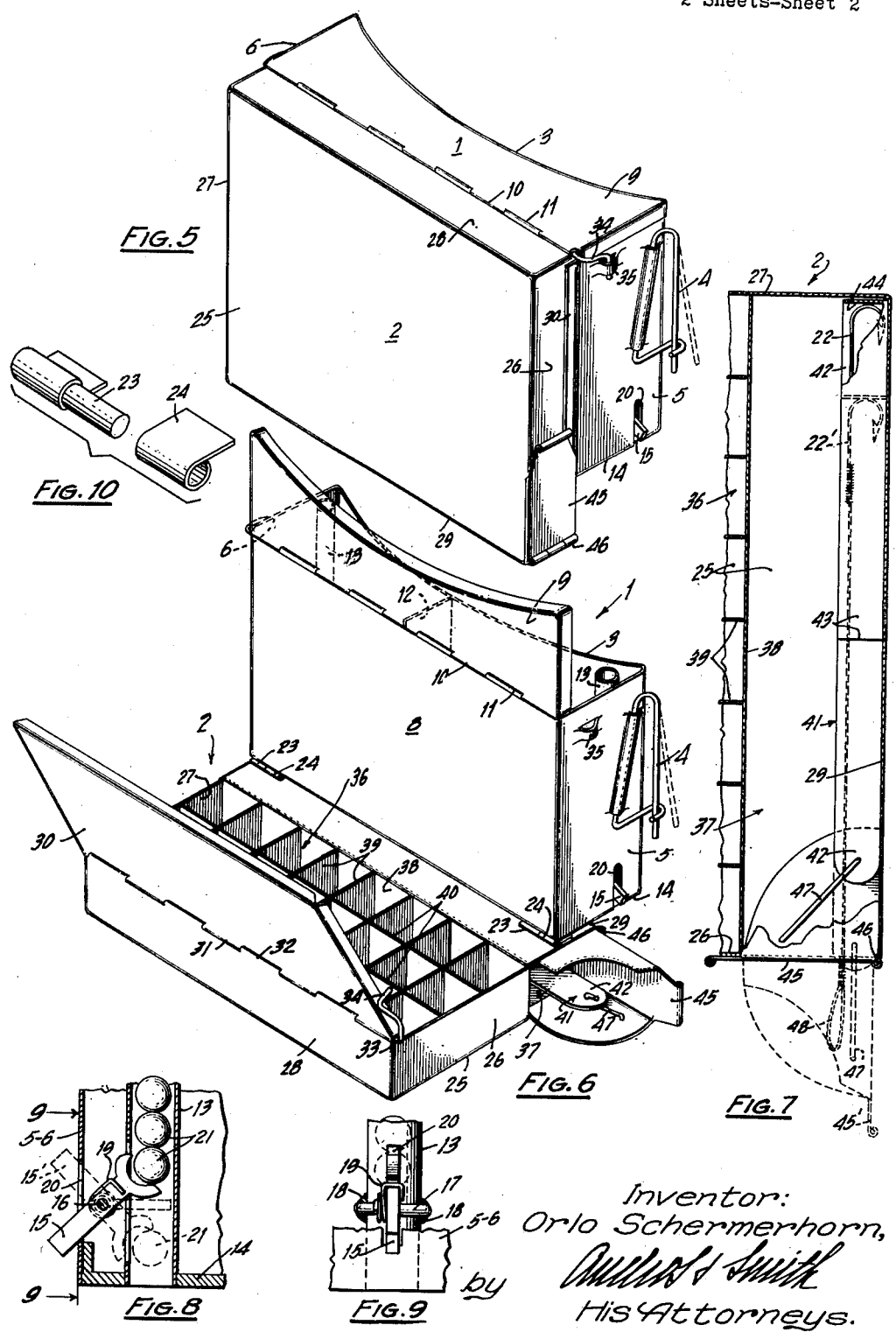

Patented May 4, 1954

2,677,486

UNITED STATES PATENT OFFICE 2,677,486

FISHERMAN'S BOX

Orlo Schermerhorn, Albany, N. Y.

Application May 3, 1950, Serial No. 159,766

4 Claims. (Cl. 224—5)

My invention relates to the art of fishing and particularly to improvements in boxes of the type which are carried by fishermen, and which are adapted to contain artificial bait or lures, hooks, sinkers, and the other usual accessories and supplies required by a fisherman on a stream or lake.

One of the objects of my invention is to provide a compact unit adapted to be secured to the belt of a fisherman and which is provided with a compartment adapted to contain natural bait as well as a compartment for artificial bait or lures, hooks, split shot, and other small accessories. Another object is to provide a fisherman's box comprising two elements which are connected together, one of which is adapted to contain natural bait, such as worms, bugs, or dead minnows, and the other of which is adapted to contain flies, spoons, plugs, hooks, etc., but which said elements are readily separable so that a fisherman, desiring to fish exclusively with natural bait or exclusively with flies or the like, need carry but one of said elements. Another object is to provide a box of this character having hinged covers thereon in which the sections of at least one of said hinges are each an inch long and one inch apart so that they may be used as a scale for measuring fish that are caught. Another object is to provide a fisherman's box having two substantially separate container elements provided with covers therefor which can be opened in such a direction that the fisherman will have a clear view of the contents of each of the containers. A further object is to provide a box of this character with a means for carrying split shot and which is provided with a manually operable latch for releasing said shot one at a time.

I accomplished these objects by means of the novel elements and the combinations and arrangements thereof described below and illustrated in the accompanying drawings in which—

Fig. 1 is a top view of the box;

Fig. 2 is an end view;

Fig. 3 is a top plan view similar to Fig. 1, with portions broken away, and showing one of the elements swung into a position at right angles to the other;

Fig. 4 is an end elevation of the box as shown in Fig. 3;

Fig. 5 is a perspective view of the box with the two elements thereof in closely assembled relation;

Fig. 6 is a perspective view of the box with the elements disposed at 90° to each other with the covers of each of the compartments open;

Fig. 7 is a fragmentary section of Fig. 4 in the plane 7—7;

Fig. 8 is a fragmentary section of Fig. 3 in the plane 8—8 showing a split shot container element and the dispensing latch for said shot;

Fig. 9 is a fragmentary elevation view of Fig. 8 as viewed in the direction of the arrows 9—9; and Fig. 10 is an exploded perspective view of one of the hinges which secure the two principal elements of the box together.

Referring to the drawings, 1 represents generally the container element which is adapted to contain the natural bait, and 2 represents generally the container element adapted to contain the artificial bait or lures.

The element 1 comprises in and of itself a container having one curved or concave side 3 conforming approximately to the shape of the body of the fisherman when it is attached to his belt by means of the belt loops 4. These loops are formed somewhat like safety pins in that they may be opened, as shown in dotted outline in Figs. 2, 5 and 6, so that the belt may be readily inserted therein. The element 1 is also provided with ends 5 and 6, an intermediate bottom 7, a plane side 8, and a cover 9 which is connected to the top edge of side 8 by means of the hinge members 10 and 11. The hinge members 10 are integral with the cover 9 and the members 11 are integral with the plane side 8 of the element 1 so that, when the cover is raised, it swings away from the fisherman's body to give him a clear view of the inside of the container and its contents. The interior of the container 1 is preferably divided into sub-compartments by means of a vertical partition 12 so that worms, for example, may be carried in one of the sub-compartments and another kind of natural bait, such as bugs, may be carried in the other compartment.

Secured within the element 1 adjacent each end thereof is a vertical tube 13 adapted to contain split shot. These tubes may be of different size to contain shot of different sizes and are open at the top and bottom; the lower portion of each tube extending through the main bottom 14 of the element 1, as best shown in Fig. 8. In order to hold the shot in the tube and to release them one at a time through the bottom of the tube, I provide a dispensing latch 15 pivotally connected at 16 to an element 17 (see Fig. 9) which is welded to the sides of the tube as shown at 18. A torsion spring 19 normally holds the latch 15 in the position shown in solid outline in Figs. 2, 4, 5, 6, 8 and 9.

The end of the latch 15 extends through an opening 20 in the end wall of the element 1 (see Figs. 5 and 6) and the upper end of the latch is bifurcated as best shown in Fig. 8. In order to release one of the shot 21 the outer end of the latch 15 is raised to the position 15' which pulls down the lowermost shot in the tube and allows it to drop into the hand of the fisherman from the bottom of the tube.

The element 2, which is adapted to contain artificial bait and lures, such as flies, spoons, or plugs in one subcompartment and hooks 22 (see Fig. 7) in another compartment, is a comparatively flat box of the same length as the element 1 and which is hingedly connected to the bottom edge of the plane side 8 of the element 1 by means of the hinge elements 23 and 24, shown in detail in Fig. 10. One of the elements 23 of each hinge is a male element and may be attached either to the element 1 or to the element 2, while the members 24 are female members and are attached to the other container element. The hinge elements 23 and 24 slidably interfit with each other so that the container element 2 may be separated from the container element 1 by merely pushing the hinge members 23 and 24 out of engagement with each other.

The element 2 has a bottom 25, ends 26 and 27, sides 28 and 29 and a cover 30. The cover 30 is secured to the free edge of the side 28 by means of hinge elements 31 and 32 and a hinge pin or rod 33 which extends beyond the hinges at each end to form hooks 34 adapted to engage struck-out portions 35 in the ends 5 and 6 of element 1 for holding the elements 1 and 2 in closely assembled or closed relation, as shown in Figs. 1, 2 and 5.

It will be noted that, while the hinge elements 24 are secured to the bottom of the element 1 at the lower edge of the plane side 8, the hinge elements 23 which cooperate therewith are secured to the element 2 in a zone adjacent but spaced from the side 29 of element 2 and which side may be said to constitute the bottom of the container 2 when the containers 1 and 2 are in closely assembled relation as shown in Figs. 2 and 5. Thus, when the container 2 is swung from the position shown in Fig. 5 to the position shown in Fig. 6, the movement thereof will be limited substantially to 90°. It will also be noted that the cover 30 opens in a direction away from the fisherman (when the box is attached to his belt) so that he has a clear view of the larger compartment 36 of the container 2 and the contents thereof. The smaller compartment 37 (see Figs. 6 and 7) is separated from the compartment 6 by means of the partition 38.

The compartment 36, as illustrated, is divided in a plurality of smaller compartments by means of partitions, such as 39 and 40, adapted to contain flies. These partitions are preferably formed substantially like the partitions in an egg crate so that some or all of them are removable to form larger subcompartments adapted to contain plugs, spoons or the like.

The compartment 37 is adapted to contain snelled hooks 22 and is provided with an elongated, U-shaped element represented generally at 41 and which comprises a base 42 and a shorter top member 43 which is connected to the base member by means of the vertical wall 44 (see Fig. 7). The compartment 37 is closed by the cover 45 having a hinge 46, and the base member 42 of the hook carrying device is connected to the cover by means of the link 47. Thus, when the cover is opened to the position shown at 45' in Fig. 7, the hook holding member 41 is pulled outwardly carrying the hooks with it so that the looped ends 48 thereof are within easy reach of the fisherman.

From the foregoing it is apparent that I have provided a comparatively small compact box unit which may be conveniently carried by the fisherman and which comprises two separate elements or sub-units which are hingedly secured together but which are readily detachable so that a fisherman desiring to use only natural bait need carry only the element which is attachable to his belt, while the fisherman who desires to fish exclusively with flies or other artificial lures may detach the element 2 from element 1 and carry it conveniently in the pocket of his coat.

While I have described my invention in its preferred embodiment it is to be understood that the words which I have used are words of description rather than of limitation, and that changes within the purview of the annexed claims may be made without departing from the true scope and spirit of my invention.

What I claim is:

1. A fisherman's box comprising a first element provided with means adapted for attaching it to a belt and having a curved side adapted to fit against the body of the fisherman, a plane side, ends, a bottom, a cover, and hinges securing said cover to the top of said plane side, and forming a container for natural bait; a second element comprising a comparatively flat rectangular container having a first compartment therein adapted to contain artificial flies and provided with a hinged cover forming one side of said compartment, and a second, elongated compartment adapted to contain snelled hooks and provided with a separate hinged cover therefor forming one end of said compartment; and means, including hinges normally securing said first and second elements together with the cover of said fly compartment lying against the plane side of said first element in closed position but adapting said second element to be swung into a position with said closed cover substantially at right angles to said plane side whereby it may be opened.

2. The structure set forth in claim 1 in which said hook compartment is provided therein with a slidable hook-carrying member, and a link attaching said member to the cover of said compartment; whereby when said cover is opened said member will be pulled partially from said compartment to facilitate access to said hooks.

3. The structure set forth in claim 1 in which the hinges connecting said first and said second element together comprise readily separable male and female members; whereby, a fisherman desiring to fish only with natural bait may discard said second element.

4. The structure set forth in claim 1 in which the hinges connecting said first element to its cover have a plurality of portions exposed on the top of said cover which are one inch long and one inch apart forming a scale adapted for measuring the length of fish.

References Cited in the file of this patent

UNITED STATES PATENTS

| Number | Name | Date |
|---|---|---|
| 523,503 | Alberschardt | July 24, 1894 |
| 559,899 | Kuegler | May 12, 1896 |
| 1,388,187 | Marble | Aug. 23, 1921 |
| 1,415,776 | Bourne | May 9, 1922 |
| 1,522,210 | Scroker | Jan. 6, 1925 |
| 1,549,400 | Wimler | Aug. 11, 1925 |
| 1,736,337 | Borel | Nov. 19, 1929 |
| 1,778,952 | McCullough | Oct. 21, 1930 |
| 1,806,477 | Lloyd | May 19, 1931 |
| 1,895,466 | Kuntz | Jan. 31, 1933 |
| 2,443,861 | Johnston | June 22, 1948 |
| 2,539,302 | Fye | Jan. 23, 1951 |